(12) United States Patent
Wang et al.

(10) Patent No.: US 11,728,474 B2
(45) Date of Patent: Aug. 15, 2023

(54) ELECTRODE AND ELECTROCHEMICAL DEVICE INCLUDING THE SAME

(71) Applicant: NINGDE AMPEREX TECHNOLOGY LIMITED, Ningde (CN)

(72) Inventors: Huixin Wang, Ningde (CN); Silin Huang, Ningde (CN); Hongming Yu, Ningde (CN); Sheng Cheng, Ningde (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 149 days.

(21) Appl. No.: 16/534,494

(22) Filed: Aug. 7, 2019

(65) Prior Publication Data
US 2020/0313171 A1  Oct. 1, 2020

(30) Foreign Application Priority Data

Mar. 29, 2019 (CN) .......................... 201910253064.5

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/1393* (2013.01); *H01M 10/052* (2013.01)

(58) Field of Classification Search
None
See application file for complete search history.

(56) References Cited

U.S. PATENT DOCUMENTS

| | | | |
|---|---|---|---|
| 7,081,142 B1 * | 7/2006 | Carlson ............... | H01M 50/414 |
| | | | 429/231.9 |
| 2009/0202903 A1 * | 8/2009 | Chiang ................. | H01M 4/485 |
| | | | 429/203 |

(Continued)

FOREIGN PATENT DOCUMENTS

| | | |
|---|---|---|
| CN | 2758991 Y | 2/2006 |
| CN | 101662011 A | 3/2010 |

(Continued)

OTHER PUBLICATIONS

Office Action dated May 25, 2021, issued in CN Application No. 201910251826.8, with English Translation. (Counterpart to U.S. Appl. No. 16/534,191) (16 pages).

(Continued)

*Primary Examiner* — Amanda J Barrow
(74) *Attorney, Agent, or Firm* — WHDA, LLP

(57) ABSTRACT

A battery cell is disclosed having a cathode including a cathode substrate with a surface coating of a first cathode active material in a first cathode region and a second cathode active material in a second cathode region, an anode including an anode substrate having a surface coating of a first anode active material in a first anode region and a second anode active material in a second anode region, wherein a value $CB_1$ is a ratio of a unit area capacity $Cs_{A1}$ of the first anode region to a unit area capacity $Csc_1$ of the first cathode region, a value $C_{B2}$ is a ratio of a unit area capacity $Cs_{A2}$ of the second anode region to a unit area capacity $Csc_2$ of the second cathode region, wherein the surface coating of the cathode and/or anode is a partitioned coating including different active materials, and wherein $CB_2 \geq CB_1$.

7 Claims, 2 Drawing Sheets

(51) Int. Cl.
*H01M 4/1393* (2010.01)
*H01M 10/052* (2010.01)

(56) References Cited

U.S. PATENT DOCUMENTS

| | | | | |
|---|---|---|---|---|
| 2009/0305129 | A1 | 12/2009 | Fukui et al. | |
| 2012/0308861 | A1* | 12/2012 | Xing | H01M 4/661 |
| | | | | 29/623.5 |
| 2014/0248528 | A1 | 9/2014 | Takahata et al. | |
| 2015/0017522 | A1 | 1/2015 | Miyatake et al. | |
| 2015/0017527 | A1* | 1/2015 | Lee | H01M 4/364 |
| | | | | 429/213 |
| 2015/0279577 | A1* | 10/2015 | Uchida | H01M 10/052 |
| | | | | 429/324 |
| 2016/0093913 | A1 | 3/2016 | Saito et al. | |
| 2018/0233738 | A1* | 8/2018 | Jung | H01M 4/525 |
| 2018/0366786 | A1* | 12/2018 | Fujii | H01M 10/056 |
| 2019/0123337 | A1* | 4/2019 | Hasegawa | H01M 50/543 |
| 2021/0098793 | A1 | 4/2021 | Date et al. | |

FOREIGN PATENT DOCUMENTS

| | | | | |
|---|---|---|---|---|
| CN | 102468475 | A | | 5/2012 |
| CN | 102969480 | A | | 3/2013 |
| CN | 103545559 | A | | 1/2014 |
| CN | 104126242 | A | | 10/2014 |
| CN | 104882611 | A | | 9/2015 |
| CN | 103682242 | B | | 1/2018 |
| CN | 108258193 | A | | 7/2018 |
| CN | 108258193 | A * | 7/2018 | ........ H01M 10/0525 |
| CN | 108306052 | A | | 7/2018 |
| CN | 108352506 | A | | 7/2018 |
| CN | 109088091 | A | | 12/2018 |
| CN | 109192925 | A | | 1/2019 |
| CN | 109244362 | A | | 1/2019 |
| JP | 2014-211944 | A | | 11/2014 |
| JP | 2017216149 | A | | 12/2017 |
| WO | 2011080901 | A1 | | 7/2011 |
| WO | 2018079817 | A1 | | 5/2018 |

OTHER PUBLICATIONS

First Office Action dated May 18, 2020 in CN Application No. 201910251826.8, with English Translation (Counterpart to U.S. Appl. No. 16/534,191) (21 pages).

Second Office Action dated Jan. 14, 2021 in CN application No. 201910251826.8, with English Translation (Counterpart to U.S. Appl. No. 16/534,191) (23 pages).

First Office Action dated Apr. 22, 2020 in CN application No. 201910251838.0, with English Translation. (Counterpart to U.S. Appl. No. 16/534,326) (14 pages).

"Expansion behavior of anode graphite in Li-ion battery," Chi et al.. School of Food and Phamaceuticals, Suihua Univesity 2016, vol. 40, No. 1, 5 pages in Chinese with English abstract.

Third Office Action and Search Report dated Mar. 29, 2021 in CN application No. 201910251838.0, with English Translation. (Counterpart to U.S. Appl. No. 16/534,326) (13 pages).

Notification of Grant of Patent dated May 28, 2021 in CN application No. 201910251838.0, with English Translation. (Counterpart to U.S. Appl. No. 16/534,326) (3 pages).

Non-Final Office Action dated May 5, 2021, issued in U.S. Appl. No. 16/534,326 (12 pages).

Final Office Action dated Aug. 20, 2021, issued in U.S. Appl. No. 16/534,326 (15 pages).

Non-Final Office Action dated Aug. 4, 2021, issued in U.S. Appl. No. 16/534,191 (14 pages).

Final Office Action dated Dec. 1, 2021, issued in U.S. Appl. No. 16/534,191 (15 pages).

Advisory Action dated Dec. 1, 2022, issued in U.S. Appl. No. 16/534,191. (9 pages).

Non-Final Office Action dated May 10, 2022, issued in U.S. Appl. No. 16/534,326. (20 pages).

Final Office Action dated Aug. 16, 2022, issued in U.S. Appl. No. 16/534,326. (17 pages).

Advisory Action dated Oct. 28, 2022, issued in U.S. Appl. No. 16/534,326. (15 pages).

Merriam-Webster online definition of "partition" (Year: 2022).

Notice of Allowance dated Feb. 8, 2023, issued in U.S. Appl. No. 16/534,191. (15 pages).

* cited by examiner

Prior Art

ELECTRODE AND ELECTROCHEMICAL DEVICE INCLUDING THE SAME

CROSS REFERENCE TO RELATED APPLICATIONS

The present application claims the benefit of priority from the China Patent Application No. 201910253064.5, filed on 29 Mar. 2019, the disclosure of which is hereby incorporated by reference in its entirety.

BACKGROUND

1. Technical Field

The present application relates to the technical field of energy storage, and more particularly to an electrode and an electrochemical device including the electrode.

2. Description of the Related Art

With the popularity of consumer electronic products such as notebook computers, mobile phones, handheld game consoles, tablet computers, mobile power supplies, and drones, the requirements for electrochemical devices (for example, batteries) have become ever more stringent. For example, people require not only light weight but also high capacity and long service life of the batteries. Among the numerous types of batteries available, lithium ion batteries have occupied an established position due to their outstanding advantages, such as high energy density, notable safety, low self-discharge, no memory effect, and long service life.

However, to date, the safety of electrochemical device has not been effectively guaranteed. For example, when a lithium ion battery undergoes a long-term charge and discharge cycle, lithium is precipitated on the surface of the electrode of the lithium ion battery, particularly on the surface of the anode, forming lithium dendrites. The formation of lithium dendrites will inevitably cause a breakdown of the separator between the anode and the cathode, resulting in the direct contact of the cathode and the anode and thus causing an electrochemical short circuit, thereby greatly reducing the safety of the battery cell. Therefore, improving the safety of electrochemical devices is an important research topic in the field.

SUMMARY

The present application provides an electrode, a battery cell, and an electrochemical device including the electrode in an attempt to solve at least one of the problems in the related art at least to some extent.

In one embodiment, the present application provides an anode, including a first anode region and a second anode region, and the unit area capacity $Cs_{A2}$ of the second anode region is greater than or equal to the unit area capacity $Cs_{A1}$ of the first anode region.

In some embodiments, the first anode region includes a body region of the anode, and the second anode region includes an edge region of the anode.

In some embodiments, a thickness of the second anode region is less than a thickness of the first anode region.

In some embodiments, the first anode region and the second anode region respectively include different anode active materials.

In some embodiments, the theoretical specific capacity of the anode active material of the first anode region is less than the theoretical specific capacity of the anode active material of the second anode region.

In some embodiments, the anode further includes a third anode region, and the third anode region includes ceramic.

In some embodiments, the anode further includes a fourth anode region, and the unit area capacity $Cs_{A4}$ of the fourth anode region is greater than or equal to the unit area capacity $Cs_{A2}$ of the second anode region.

In some embodiments, a thickness of the fourth anode region is less than or equal to the thickness of the second anode region.

In one embodiment, the present application provides a cathode, including a first cathode region and a second cathode region, and the unit area capacity $Cs_{C2}$ of the second cathode region is less than or equal to 98% of the unit area capacity $Cs_{C1}$ of the first cathode region.

In some embodiments, the first cathode region includes a body region of the cathode, and the second cathode region includes an edge region of the cathode.

In some embodiments, a thickness of the second cathode region is less than a thickness of the first cathode region.

In some embodiments, the first cathode region and the second cathode region respectively include different cathode active materials.

In some embodiments, the first cathode region includes a ternary material and/or lithium cobalt oxide, and the second cathode region includes lithium iron phosphate.

In some embodiments, the theoretical specific capacity of the cathode active material of the first cathode region is greater than the theoretical specific capacity of the cathode active material of the second cathode region.

In some embodiments, the cathode further includes a third cathode region, and the third cathode region includes ceramic.

In some embodiments, the cathode further includes a fourth cathode region, and the unit area capacity $Cs_{C4}$ of the fourth cathode region is less than or equal to the unit area capacity $Cs_{C2}$ of the second cathode region.

In some embodiments, the thickness of the fourth cathode region is less than or equal to the thickness of the second cathode region.

In one embodiment, the present application provides a battery cell, including: a cathode, the cathode including a first cathode region and a second cathode region; an anode, the anode including a first anode region and a second anode region; where the value $CB_1$ of the first region is the ratio of the unit area capacity $Cs_{A1}$ of the first anode region to the unit area capacity $Cs_{C1}$ of the first cathode region, where the value $CB_2$ of the second region is the ratio of the unit area capacity $Cs_{A2}$ of the second anode region to the unit area capacity $Cs_{C2}$ of the second cathode region, and where $CB_2 \geq CB_1$.

In some embodiments, the anode in the battery cell is the anode in the above embodiments.

In some embodiments, the cathode in the battery cell is the cathode in the above embodiments.

In some embodiments, the anode in the battery cell further includes the third anode region and/or the fourth anode region of the above embodiments, where the third anode region includes ceramic, where the unit area capacity $Cs_{A4}$ of the fourth anode region is greater than or equal to the unit area capacity $Cs_{A2}$ of the second anode region.

In some embodiments, the cathode in the battery cell further includes the third cathode region and/or the fourth cathode region of the above embodiments, where the third cathode region includes ceramic, where the unit area capacity $Cs_{C4}$ of the fourth cathode region is less than or equal to the unit area capacity $Cs_{C2}$ of the second cathode region.

By setting different unit area capacities for different regions of the of the battery cell, the present application improves the uneven deposition of lithium in different regions of the electrode of the battery cell, reduces the probability of the formation of lithium dendrites and the possibility of an electrochemical short circuit, thereby greatly enhancing the safety of the battery cell. Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the existing technology so as to facilitate the description of the embodiments of the present application. Obviously, the accompanying drawings described below are only part of the embodiments of the present application. For those skilled in the art, the accompanying drawings of other embodiments can still be obtained according to the structures illustrated in the accompanying drawings without any creative effort.

Figure 1:
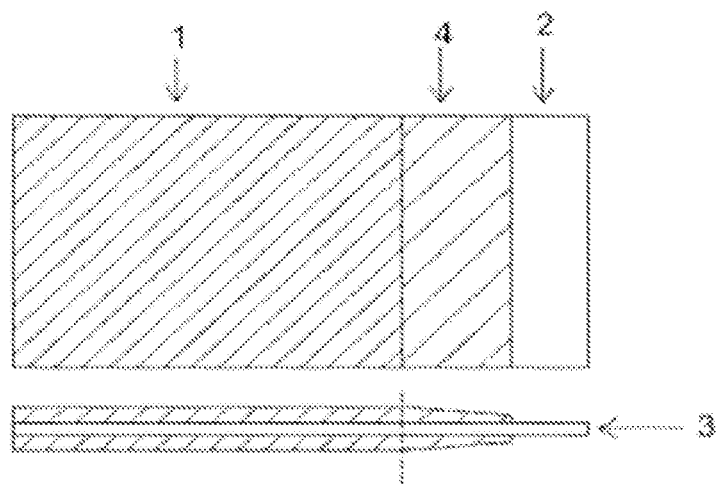
FIG. 1 shows the structure of a common electrode in the prior art.

With respect to the meanings of the reference numerals in FIG. 1 and FIG. 2 of the present application, they are described as follows:

Reference numeral 1 denotes a body region;
Reference numeral 2 denotes an empty foil region;
Reference numeral 3 denotes a substrate;
Reference numeral 4 denotes an edge thin region; and
Reference numeral 5 denotes an edge region.

DETAILED DESCRIPTION OF EMBODIMENTS

Embodiments of the present application are described in detail below. Throughout the specification, the same or similar components and components having the same or similar functions are denoted by similar reference numerals. The embodiments described herein with respect to the accompanying drawings are illustrative and graphical, and are used for providing a basic understanding on the present application. The embodiments of the present application should not be construed as limiting the present application.

As used herein, the terms "substantially", "generally", "essentially" and "about" are used to describe and explain small variations. When being used in combination with an event or circumstance, the terms may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "substantially" the same.

In addition, amounts, ratios and other numerical values are sometimes presented herein in a range format. It should be appreciated that such range formats are for convenience and conciseness, and should be flexibly understood as including not only values explicitly specified to range constraints, but also all individual values or sub-ranges within the ranges, like explicitly specifying each value and each sub-range.

The term "body region" is a region coated with a main electrode active material or a main region coated with an electrode active material. For example, in some embodiments of the present application, different regions of the electrode are respectively coated with different electrode active materials A and B (for example, a first cathode active material, a second cathode active material, a first anode active material or a second anode active material), wherein the electrode active material A is the main electrode active material, and thus the region coated with the active material A is the body region. For another example, in some embodiments of the present application, different regions C and D of the electrode are coated with the same electrode active material, wherein the area of the region C is large, and thus the region C is the body region.

The term "edge region" is a region that is a few millimeters to tens of millimeters (e.g., about 3 mm to about 40 mm) from the edge of the body region. In some embodiments of the present application, the edge region may be, but is not limited to, a region about 30 mm from the edge of the body region, a region about 20 mm from the edge of the body region, a region about 10 mm from the edge of the body region, or a region about 5 mm from the edge of the body region.

Taking lithium ion batteries as an example, electrodes currently used in lithium ion batteries have various structural categories, such as the multi-tab wound structure (MTW), full-ear wound structure (FTW), stack structure (Stack) and the like. Generally, an electrode of a lithium ion battery includes a substrate (also referred to as a current collector) and an electrode active material on at least one surface of the substrate, wherein most of the substrates are a metal material to function to transmit electrons, and the electrode active material is capable of converting chemical energy into electrical energy.

FIG. 1 shows the structure of a common electrode in the prior art. As shown in FIG. 1, in the process of preparing an electrode, in the prior art, the electrode is generally divided into a body region 1 (also referred to as an active material region), an edge thin region 4 and an empty foil region 2 (also referred to as a tab region), wherein the surfaces of the body region 1 and the edge thin region 4 are coated with the same electrode active material, but the thickness of the electrode active material of the edge thin region 4 is generally less than the thickness of the electrode active material of the body region 1, and the empty foil region is a region that is a few millimeters to tens of millimeters from the edge of the substrate 3 without being coated with any electrode active material for attaching a tab or the empty foil region itself serves as a tab.

The active material region in the electrode is generally not partitioned in the prior art. When the active material region is coated with the electrode active material, since most of the slurry exhibits a liquid state and has fluidity, it results in that, as compared to the active material region, the empty foil region has less electrode active material and thus the electrode is thinner and forms an edge thin region 4.

For an anode, as compared with the active material region (also referred to as the body region), when a cathode per unit area releases the same amount of lithium ions, the active material of the anode thin region per unit area cannot absorb the lithium ions completely as the body region because it contains less active material, thereby resulting in excess lithium ions "accumulating" on the surface of the anode thin region. In this case, these lithium ions are deposited on the surface of the anode thin region forming lithium dendrites. In addition, since the thickness of the edge thin region 4 is less than the thickness of the body region 1, this may cause the edge thin regions of the anode and the cathode to be difficult to form a close fit, thereby causing uneven deposition of lithium ions on the surface of the anode thin region forming lithium dendrites. The formation of the lithium dendrites will largely break the separator, causing the direct contact between the cathode and the anode and thus the electrochemical short circuit, thereby greatly reducing the safety of the battery cell.

At least to overcome the above disadvantages, the present application provides a partitioned anode, a partitioned cathode and a battery cell including at least one of them. By dividing the anode and/or the cathode into a plurality of regions and performing differential coating, the degree of lithium deposition of the electrochemical device during charge and discharge can be alleviated, thereby enhancing the safety of the electrochemical device.

Figure 2:
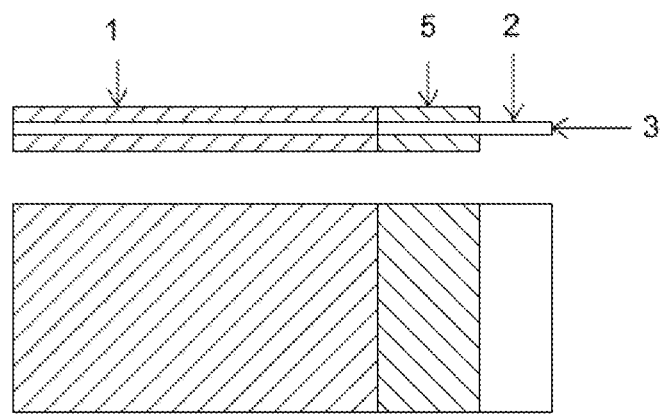
FIG. 2 shows a schematic structural view of a partitioned electrode in some embodiments of the present application.

FIG. 2 shows a schematic structural view of a partitioned electrode in some embodiments of the present application. As shown in FIG. 2, in some embodiments of the present application, the electrode includes a substrate 3 and an electrode active material coated on at least one surface of the substrate, wherein the electrode includes a first region (e.g., body region 1) and a second region (e.g., edge region 5), and wherein the above objectives are achieved by adjusting the unit area capacities of the first region and the second region. It should be noted that FIG. 2 is only a schematic structural view of an electrode drawn to facilitate a person skilled in the art to better understand the technical solutions described in the present application, and the electrode described in the present application is not identical in any detail to that shown in FIG. 2. For example, the thickness of the edge region 5 in FIG. 2 seems to be the same as the thickness of the body region 1, and the thicknesses of the edge region 5 and the body region 1 of the electrode described in the present application may be the same or different.

I. ANODE

One embodiment of the present application provides an anode, including a first anode region and a second anode region, wherein the unit area capacity $Cs_{A2}$ of the second anode region is greater than or equal to the unit area capacity $Cs_{A1}$ of the first anode region. In some embodiments, the first anode region includes a body region of the anode, and the second anode region includes an edge region of the anode. In some embodiments, the thickness of the second anode region of the anode is less than the thickness of the first anode region of the anode.

By adjusting the unit area capacity of the thin region of the anode to be greater than or equal to the unit area capacity of the body region of the anode, the thin region of the anode can have at least the same or even stronger ability to "absorb" lithium ions than the body region of the anode. Therefore, when the cathode per unit area releases the same amount of lithium ions, the active material of the anode thin region per unit area can absorb these lithium ions like the body region without causing the phenomenon of "excess lithium ion accumulation". Accordingly, the probability of formation of lithium dendrites on the surface of the thin region of the anode is greatly reduced, thereby enhancing the safety of the battery cell.

In some embodiments of the present application, the anode includes an anode substrate (also referred to as an anode current collector) and an anode active material on at least one surface of the anode substrate. In some embodiments, the anode substrate may be, but is not limited to, copper foil or nickel foil.

The anode active material of the lithium ion battery includes an anode material capable of absorbing and releasing lithium (Li) (hereinafter, sometimes referred to as "an anode material capable of absorbing/releasing lithium Li"). The anode material capable of absorbing/releasing lithium (Li) may include, but is not limited to, a carbon material, a metal compound, an oxide, a sulfide, a nitride of lithium such as $LiN_3$, a lithium metal, and a metal which forms an alloy with lithium, and a polymer material.

The carbon material may include, but is not limited to, low graphitized carbon, easily graphitized carbon, artificial graphite, natural graphite, mesocarbon microbeads, soft carbon, hard carbon, pyrolytic carbon, coke, vitreous carbon, an organic polymer-compound sintered body, carbon fiber and activated carbon. The coke can include pitch coke, needle coke and petroleum coke. The organic polymer-compound sintered body refers to a material obtained by calcining a polymer material (for example, phenol plastic or furan resin) at a suitable temperature and carbonizing the same. These materials can be classified into low graphitized carbon or easily graphitized carbon. The polymer material can include, but is not limited to, polyacetylene and polypyrrole.

Further, for these anode materials capable of absorbing/releasing lithium (Li), the materials of which the charging and discharging voltages are close to the charging and discharging voltages of lithium metal can be selected. This is because the lower the charging and discharging voltages of the anode material are, the easier it is for lithium ion battery to have higher energy density. Carbon materials can be selected as the anode material because their crystal structures only slightly change during charging and discharging, therefore good cycle characteristics and large charging and discharging capacities can be obtained. In particular, graphite may be selected because it can provide a large electrochemical equivalent and a high energy density.

Further, the anode material capable of absorbing/releasing lithium (Li) can include elemental lithium metals, metal elements and semi-metal elements capable of forming alloys together with lithium (Li), alloys and compounds including such elements, etc. In particular, the above materials are used together with the carbon material since in such a case, good cycle characteristics as well as high energy density can be obtained. In addition to the alloys including two or more metal elements, the alloys used here also include alloys including one or more metal elements and one or more semi-metal elements. The alloy may be in one of the following states: a solid solution, a eutectic crystal (eutectic mixture), an intermetallic compound, or a mixture thereof.

Examples of the metal elements and the semi-metal elements can include stannum (Sn), plumbum (Pb), aluminum (Al), indium (In), silicon (Si), zinc (Zn), stibium (Sb), bismuth (Bi), cadmium (Cd), magnesium (Mg), boron (B), gallium (Ga), germanium (Ge), arsenic (As), silver (Ag), zirconium (Zr), yttrium (Y) or hafnium (Hf). Examples of the above alloys and compounds may include a material having a chemical formula: $Ma_sMb_tLi_u$ and a material having a chemical formula: $Ma_pMc_qMd_r$. In these chemical formulas, Ma denotes at least one of the metal elements and the semi-metal elements capable of forming an alloy together with lithium; Mb denotes at least one of the metal elements and the semi-metal elements except lithium and Ma; Mc denotes at least one of the non-metal elements; Md denotes at least one of the metal elements and the semi-metal elements except Ma; and s, t, u, p, q and r satisfy s>0, t≥0, u≥0, p>0, q>0 and r≥0.

In addition, an inorganic compound not including lithium (Li), such as $MnO_2$, $V_2O_5$, $V_6O_{13}$, NiS and MoS, may be used in the anode.

Table 1 lists some anode materials for lithium ion batteries and their specific capacities, wherein a corresponding anode active material may be selected to coat the first anode region or the second anode region based on the specific capacities of these anode materials. In some embodiments of the present application, one of the following anode active materials may be selected, or a mixture of a plurality of the following anode active materials may be selected to coat the first anode region. In some embodiments of the present application, one of the following anode active materials may be selected, or a mixture of a plurality of the following anode active materials may be selected to coat the second anode region. However, it should be understood that Table 1 is merely illustrative of some of the anode materials, and implementations of the present application are not limited to the listed anode materials. Further, the specific capacities given in Table 1 are the actual achievable specific capacities of the anode active materials, wherein modification of the anode active material causes a small change in the specific capacity value.

TABLE 1

| Anode Active Material | Abbr | Specific Capacity (mAh/g) | Average Voltage (vs Li/Li+) |
|---|---|---|---|
| Graphite | Gr | 370 | 0.1 |
| Graphene nanosheets | GNS | 740 | 0.1 |
| Soft carbon-250 | SC-250 | 250 | 0.5 |
| Soft carbon-400 | SC-400 | 400 | 0.5 |
| Hard carbon | HC | 450 | 0.5 |
| SiOx-420 (0 ≤ x ≤ 2) | SiOx-420 | 420 | 0.2 |
| SiOx-1000 (0 ≤ x ≤ 2) | SiOx-1000 | 1000 | 0.4 |
| Si—C-450 | SiC-450 | 450 | 0.2 |
| Si—C-1000 | SiC-1000 | 1000 | 0.4 |
| Si—C-2000 | SiC-2000 | 2000 | 0.4 |
| $Li_4Ti_5O_{12}$ | LTO | 160 | 1.56 |
| Li metal | Li | 3860 | 0 |
| Sn | Sn | 980 | 0.4 |
| Ge | Ge | 960 | 0.4 |
| $SnO_2$ | $SnO_2$ | 780 | 0.4 |
| $TiO_2$ | $TiO_2$ | 360 | 1.5 |
| $Fe_2O_3$ | $Fe_2O_3$ | 1000 | 0.7 |
| $MoS_2$ | $MoS_2$ | 910 | 0.7 |

In some embodiments of the present application, the first anode region and the second anode region may respectively include different anode active materials. In some embodiments of the present application, the theoretical specific capacity of the anode active material of the first anode region is less than the theoretical specific capacity of the anode active material of the second anode region.

In some embodiments of the present application, the anode further includes a third anode region, wherein the third anode region is disposed at the edge of the substrate to function as an insulation to prevent a short circuit between the anode and the cathode. In some embodiments, the third anode region includes ceramic, wherein the unit area capacity of the ceramic is 0.

In some embodiments of the present application, the anode further includes a fourth anode region, wherein the unit area capacity $Cs_{A4}$ of the fourth anode region is greater than or equal to the unit area capacity $Cs_{A2}$ of the second anode region. In some embodiments of the present application, the thickness of the fourth anode region of the anode is less than or equal to the thickness of the second anode region of the anode. In some embodiments of the present application, the fourth anode region is disposed adjacent to the second anode region but away from the first anode region. The arrangement principle of the fourth anode region is similar to that of the second anode region, and both of them are to compensate for the area specific capacity of the thin region to enhance the lithium intercalation ability of the thin region.

In some embodiments of the present application, the first anode region includes an anode body region, the second anode region includes a first anode edge region, and the third anode region includes a second anode edge region, wherein the second anode edge region is adjacent to the first anode edge region but away from the anode body region.

In some embodiments of the present application, the fourth anode region may include an anode active material different from the first anode region and the second anode region, and may also include an anode active material that is only different from the first anode region but the same as the second anode region.

II. CATHODE

One embodiment of the present application provides a cathode, including a first cathode region and a second cathode region, wherein the unit area capacity $Cs_{C2}$ of the second cathode region is less than or equal to 98% of the unit area capacity $Cs_{C1}$ of the first cathode region. In some embodiments, the first cathode region includes a body region of the cathode, and the second cathode region includes an edge region of the cathode. In some embodiments, the thickness of the second cathode region of the cathode is less than the thickness of the first cathode region of the cathode.

By adjusting the unit area capacity of the cathode thin region to be less than or equal to about 98% of the unit area capacity of the body region of the cathode, the thin region of the cathode per unit area can release less lithium ions than the body region of the cathode per unit area. Therefore, the active material of the anode thin region per unit area only needs to "load" these less lithium ions, and does not need to "load" more lithium ions like the anode body region. Therefore, the phenomenon of "excess lithium ion accumulation" does not occur in the anode thin region. Accordingly, the probability of formation of lithium dendrites on the surface of the thin region of the anode is greatly reduced, thereby enhancing the safety of the battery cell.

In some embodiments of the present application, the unit area capacity $Cs_{C2}$ of the second cathode region is less than or equal to about 95%, about 90%, about 85%, about 80%, about 75%, about 70%, about 65%, about 60%, about 55% or about 50% of the unit area capacity $Cs_{C1}$ of the first cathode region.

In some embodiments of the present application, the cathode includes a cathode substrate (also referred to as a cathode current collector) and a cathode active material on at least one surface of the cathode substrate. In some embodiments, the cathode substrate may be, but is not limited to, aluminum foil or nickel foil.

The cathode active material layer of the lithium ion battery includes a cathode material capable of absorbing and releasing lithium (Li) (hereinafter, sometimes referred to as "a cathode material capable of absorbing/releasing lithium Li"). Examples of the cathode material capable of absorbing/releasing lithium (Li) may include, but is not limited to, lithium cobalt oxide, a ternary material, lithium manganate, lithium manganese iron phosphate, lithium vanadium phosphate, oxylithium vanadium phosphate, lithium iron phosphate, lithium titanate and a lithium-containing manganese-based material.

In the above cathode material, the chemical formula of lithium cobalt oxide can be, but is not limited to, $Li_xCo_aM1_bO_{2-c}H_d$, wherein M1 is selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and combinations thereof, wherein H is selected from the group consisting of fluorine (F), sulfur (S), boron (B), nitrogen (N) or phosphorus (P), and combinations thereof, and the values of x, a, b and c are respectively in the following ranges: $0.8 \leq x \leq 1.2$, $0.8 \leq a \leq 1$, $0 \leq b \leq 0.2$ and $-0.1 \leq c \leq 0.2$.

In the above cathode material, the ternary material refers to a material capable of reversibly intercalating and deintercalating lithium ions, which is composed of a lithium element, three different metal elements other than lithium, and oxygen. In some embodiments, the chemical formula of the ternary material may be $Li_yM2_eM3_fM4_gO_{2-h}$, wherein M2-M4 are selected from the group consisting of nickel (Ni), cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), silicon (Si) and combinations thereof, the values of y, e, f, g and h are respectively in the following ranges: $0.8 \leq y \leq 1.2$, $0.3 \leq e \leq 0.98$, $0.02 \leq f \leq 0.7$, $0.02 \leq g \leq 0.7$, $-0.1 \leq h \leq 0.2$. In some embodiments of the present application, the ternary material includes lithium nickel cobalt manganese oxide and/or lithium nickel cobalt aluminum oxide.

In the above cathode material, the chemical formula of lithium manganate is $Li_zMn_{2-p}M5_pO_{4-r}$, wherein M5 is selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W) and combinations thereof, and the values of z, p and r are respectively in the following ranges: $0.8 \leq z \leq 1.2$, $0 \leq p \leq 1.0$ and $-0.2 \leq r \leq 0.2$.

Table 2 lists some cathode materials for lithium ion batteries and their specific capacities, wherein a corresponding cathode active material may be selected to coat the first cathode region or the second cathode region based on the specific capacities of these cathode materials. In some embodiments of the present application, one of the following cathode active materials may be selected, or a mixture of a plurality of the following cathode active materials may be selected to coat the first cathode region. In some embodiments of the present application, one of the following cathode active materials may be selected, or a mixture of a plurality of the following cathode active materials may be selected to coat the second cathode region. However, it should be understood that Table 2 is merely illustrative of some of the cathode materials, and implementations of the present application are not limited to the listed cathode materials. Further, the specific capacities given in Table 2 are the actual achievable specific capacities of the cathode active materials, wherein modification of the cathode active material causes a small change in the specific capacity value.

TABLE 2

| Cathode Active Material | Abbr | Specific Capacity (mAh/g) | Average Voltage (vs Li/Li+) |
|---|---|---|---|
| $LiCoO_2$-140 | LCO-140 | 140 | 3.8 |
| $LiCoO_2$-180 | LCO-180 | 180 | 4.3 |
| $LiCoO_2$-220 | LCO-220 | 220 | 4.3 |
| $LiMn_2O_4$ | LMO | 130 | 4.05 |
| $LiFePO_4$ | LFP | 160 | 3.4 |
| $LiCoPO_4$ | LCP | 130 | 4.8 |
| $LiNiO_2$ | LNO | 200 | 3.7 |
| $LiNi_{0.33}Mn_{0.33}Co_{0.33}O_2$ | NCM333 | 160 | 3.7 |
| $LiNi_{0.5}Mn_{0.2}Co_{0.3}O_2$ | NCM523 | 180 | 3.7 |
| $LiNi_{0.6}Mn_{0.2}Co_{0.2}O_2$ | NCM622 | 200 | 3.7 |
| $LiNi_{0.8}Mn_{0.1}Co_{0.1}O_2$ | NCM811 | 220 | 3.7 |
| $yLi_2MnO_3(1-y)LiMO_2$ (M=Ni, Co, Mn)-250 ($0 \leq y \leq 1$) | Li-rich-250 | 250 | 3.75 |
| $yLi_2MnO_3(1-y)LiMO_2$ (M=Ni, Co, Mn)-280 ($0 \leq y \leq 1$) | Li-rich-280 | 280 | 3.75 |
| $yLi_2MnO_3(1-y)LiMO_2$ (M=Ni, Co, Mn)-300 ($0 \leq y \leq 1$) | Li-rich-300 | 300 | 3.75 |
| $LiNi_{0.8}Co_{0.15}Al_{0.05}O_2$-180 | NCA-180 | 180 | 3.7 |
| $LiNi_{0.8}Co_{0.15}Al_{0.05}O_2$-200 | NCA-200 | 200 | 3.7 |
| $LiNi_{0.8}Co_{0.15}Al_{0.05}O_2$-220 | NCA-220 | 220 | 3.7 |
| $LiNi_{0.5}Mn_{1.5}O_4$ | LNM | 135 | 4.7 |
| $Li_3V_2(PO_4)_3$ | LVP | 180 | 3.8 |

In some embodiments of the present application, the first cathode region and the second cathode region may respectively include different cathode active materials. In some embodiments of the present application, the first cathode region includes a ternary material and/or lithium cobalt oxide, and the second cathode region includes lithium iron phosphate, wherein the unit area specific capacity of the ternary material and/or lithium cobalt oxide is greater than the unit area specific capacity of the lithium iron phosphate.

In some embodiments of the present application, the theoretical specific capacity of the cathode active material of the first cathode region is greater than the theoretical specific capacity of the cathode active material of the second cathode region.

In some embodiments of the present application, the cathode further includes a third cathode region, wherein the third cathode region is disposed at the edge of the substrate to function as an insulation to prevent a short circuit between the anode and the cathode. In some embodiments, the third cathode region includes ceramic, wherein the unit area capacity of the ceramic is 0.

In some embodiments of the present application, the cathode further includes a fourth cathode region, wherein the unit area capacity $Cs_{C4}$ of the fourth cathode region is less than or equal to the unit area capacity $Cs_{C2}$ of the second cathode region. In some embodiments of the present application, the fourth cathode region is disposed adjacent to the second cathode region but away from the first cathode region. In some embodiments, the thickness of the fourth cathode region of the cathode is less than or equal to the thickness of the second cathode region of the cathode. The arrangement principle of the fourth cathode region is similar to that of the second cathode region, and both of them are to reduce the amount of lithium ions deintercalated from the cathode thin region.

In some embodiments of the present application, the first cathode region includes a cathode body region, the second cathode region includes a first cathode edge region, and the third cathode region includes a second cathode edge region, wherein the second cathode edge region is adjacent to the first cathode edge region but away from the cathode body region.

In some embodiments of the present application, the fourth cathode region may include a cathode active material different from the first cathode region and the second cathode region, and may also include a cathode active material that is only different from the first cathode region but the same as the second cathode region.

III. BATTERY CELL AND ELECTROCHEMICAL DEVICE

One embodiment of the present application further provides a battery cell, including a cathode and an anode, wherein the cathode includes a first cathode region and a second cathode region, wherein the anode includes a first anode region and a second anode region. In the present application, the ratio of the unit area capacity $Cs_A$ of the anode to the unit area capacity $Cs_C$ of the cathode is defined as the battery cell balance value CB. In order to improve the lithium intercalation ability of the anode thin region or to reduce the lithium deintercalation ability of the cathode thin region, the present application proposes that the CB value of the thin region is greater than or equal to the CB value of the thick region.

Specifically, in the battery cell of the present application, the ratio of the unit area capacity $Cs_{A1}$ of the first anode region to the unit area capacity $Cs_{C1}$ of the first cathode region is defined as the value $CB_1$ of the first region, and the ratio of the unit area capacity $Cs_{A2}$ of the second anode region to the unit area capacity $Cs_{C2}$ of the second cathode region is defined as the value $CB_2$ of the second region, and wherein $CB_2 \geq CB_1$.

In some embodiments of the present application, the battery cell of the present application includes at least one of the cathodes described in the embodiments of the present application and the anodes described in the embodiments of the present application. The structures and compositions of the specific cathodes and anodes are described above, and are not described herein again.

In some embodiments of the present application, the anode in the battery cell further includes the third anode region and/or the fourth anode region as described in the above embodiments. In some embodiments, the cathode in the battery cell further includes the third cathode region and/or the fourth cathode region as described in the above embodiments.

In some embodiments of the present application, when the anode of the battery cell includes the fourth anode region and the cathode of the battery cell includes the fourth cathode region, the ratio of the unit area capacity $Cs_{A4}$ of the fourth anode region to the unit area capacity $Cs_{C4}$ of the fourth cathode region is further defined as the value $CB_4$ of the fourth region, wherein the relationship among $CB_1$, $CB_2$ and $CB_4$ satisfies $CB_4 \geq CB_2 \geq CB_1$.

One embodiment of the present application also provides an electrochemical device, including the battery cell described in the embodiments of the present application. In some embodiments, the electrochemical device includes a lithium ion battery.

In some embodiments, the battery cell in the lithium ion battery further includes an electrolyte. The state of the electrolyte may be one or more of a gel state, a solid state or a liquid state. The liquid electrolyte includes a lithium salt and a non-aqueous solvent.

The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiBOB and $LiPO_2F_2$. For example, $LiPF_6$ is selected as the lithium salt because it can provide a high ionic conductivity and improve cycle characteristics.

The non-aqueous solvent can be a carbonate compound, a carboxylate compound, an ether compound, a nitrile compound, other organic solvent or a combination thereof.

Examples of the carbonate compound are diethyl carbonate (DEC), dimethyl carbonate (DMC), dipropyl carbonate (DPC), methylpropyl carbonate (MPC), ethyl propyl carbonate (EPC), ethyl methyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

In some embodiments, based on the total weight of the electrolyte, the content of the carbonate compound is about 1 wt % or above. In some embodiments, the content of the carbonate compound is about 3 wt % or above. In some embodiments, the content of the carbonate compound is about 5 wt % or above. In some embodiments, the content of the carbonate compound is about 10 wt % or above. In some embodiments, the content of the carbonate compound is about 50 wt % or above. In some embodiments, the content of the carbonate compound is about 58 wt % or above. In some embodiments, the content of the carbonate compound is about 60 wt % or below. In some embodiments, the content of the carbonate compound is about 50 wt % or below. In some embodiments, the content of the cyclic carbonate compound is about 40 wt % or below. In some embodiments, the content of the carbonate compound is about 1 wt % to about 60 wt %. In some embodiments, the content of the carbonate compound is about 3 wt % to about 50 wt %.

Examples of the carboxylate compound are methyl acetate, ethyl acetate, n-propyl acetate, t-butyl acetate, methyl propionate, ethyl propionate, propyl propionate, γ-butyrolactone, decalactone, valerolactone, mevalonolactone, caprolactone, and combinations thereof.

In some embodiments, based on the total weight of the electrolyte, the content of the carboxylate compound is about 1 wt % or above. In some embodiments, the content of the carboxylate compound is about 3 wt % or above. In some embodiments, the content of the carboxylate compound is about 5 wt % or above. In some embodiments, the content of the carboxylate compound is about 10 wt % or above. In some embodiments, the content of the carboxylate compound is about 60 wt % or below. In some embodiments, the content of the carboxylate compound is about 50 wt % or below. In some embodiments, the content of the carboxylate compound is about 40 wt % or below. In some embodiments, the content of the carboxylate compound is about 1 wt % to about 60 wt %. In some embodiments, the content of the carboxylate compound is about 3 wt % to about 50 wt %.

Examples of the ether compound are tetrahydrofuran, 2-methyltetrahydrofuran, 1,3-dioxolane, 2-methyl-1,3-dioxolane, 4-methyl-1,3-dioxolane, 1,3-dioxane, 1,4-dioxane, dimethoxypropane, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, $HCF_2CF_2CH_2OCF_2CF_2H$, $(CF_3)_2CFCF$ $(CF_2CF_3)(OCH_3)$, $CF_3CHFCF_2CH(CH_3)OCF_2CHFCF_3$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$ and combinations thereof.

In some embodiments, based on the total weight of the electrolyte, the content of the ether compound is about 0.01 wt % or above. In some embodiments, the content of the ether compound is about 0.05 wt % or above. In some embodiments, the content of the ether compound is about 1 wt % or above. In some embodiments, the content of the ether compound is about 2 wt % or above. In some embodiments, the content of the ether compound is about 10 wt % or below. In some embodiments, the content of the ether compound is about 6 wt % or below. In some embodiments, the content of the ether compound is about 5 wt % or below. In some embodiments, the content of the ether compound is about 0.01 wt % to about 10 wt %. In some embodiments, the content of the ether compound is about 1 wt % to about 6 wt %.

Examples of the nitrile compound are succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-heptanedinitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic acid dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl) ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane or 1,2,4-tris(2-cyanoethoxy)butane, and combinations thereof.

In some embodiments, based on the total weight of the electrolyte, the content of the nitrile compound is about 0.01 wt % or above. In some embodiments, the content of the nitrile compound is about 0.05 wt % or above. In some embodiments, the content of the nitrile compound is about 1 wt % or above. In some embodiments, the content of the nitrile compound is about 2 wt % or above. In some embodiments, the content of the dinitrile compound is about 10 wt % or below. In some embodiments, the content of the nitrile compound is about 6 wt % or below. In some embodiments, the content of the dinitrile compound is about 5 wt % or below. In some embodiments, the content of the nitrile compound is about 0.01 wt % to about 10 wt %. In some embodiments, the content of the nitrile compound is about 1 wt % to about 6 wt %.

Examples of other organic solvents are dimethyl sulfoxide, 1,3-propane sultone, sulfolane, methyl sulfolane, 1,3-dimethyl-2-imidazolidinone, N-methyl-2-pyrrolidone, formamide, dimethylformamide, trimethyl phosphate, triethyl phosphate, trioctyl phosphate, tripropyl phosphate and a combination thereof.

In some embodiments, in the cell of the lithium-ion battery, a separator is arranged between the cathode and the anode to prevent a short circuit. The material and shape of the separator used in the cell of the present application are not particularly limited, and may be any of the techniques disclosed in the prior art. In some embodiments, the separator includes a polymer or an inorganic substance and the like formed by a material stable in the electrolyte of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

The separator needs to have mechanical robustness to withstand the stretching and piercing of the electrode material, and the pore size of the separator is typically less than 1 micron. Various separators including microporous polymer membranes, non-woven mats and inorganic membranes have been used in the lithium ion batteries, wherein the polymer membranes based on microporous polyolefin materials are the most commonly used separators in combination with the electrolyte. The microporous polymer membranes can be made very thin (typically about 5 μm-25 μm) and can be highly porous (typically about 20%-50%) to reduce electrical resistance and improve ion conductivity. Meanwhile, the polymer membrane still has mechanical robustness. Those skilled in the art will appreciate that various separators widely used in the lithium ion batteries are suitable for use in the present application.

Although the foregoing illustrates by taking the lithium ion battery as an example, after reading the present application, those skilled in the art can conceive that the cathode material of the present application can be used for other suitable electrochemical devices. Such electrochemical devices include any electrochemical reaction device, and specific examples thereof include all kinds of primary batteries, secondary batteries, fuel cells, solar cells or capacitors. In particular, the electrochemical device is a lithium secondary battery, including a lithium metal secondary battery, a lithium ion secondary battery, a lithium polymer secondary battery, or a lithium ion polymer secondary battery.

IV. APPLICATION

The electrochemical device manufactured from the electrode according to the present application is suitable for electronic devices in various fields.

The use of the electrochemical device of the present application is not particularly limited and can be used for any use known in the art. In one embodiment, the electrochemical device of the present application can be used for, but is not limited to, notebook computers, pen input computers, mobile computers, e-book players, portable telephones, portable fax machines, portable copy machines, portable printers, headsets, stereo headphones, VCRs, LCD TVs, portable cleaners, portable CD players, mini disc players, transceivers, electronic notebooks, calculators, memory cards, portable recorders, radios, backup powers, motors, cars, motorcycles, power bicycles, bicycles, lighting fixtures, toys, game consoles, clocks, power tools, flashlights, cameras, large household batteries, lithium ion capacitors, and the like.

Hereinafter, the preparation and efficiency of the lithium ion battery of the present application are described by taking the lithium ion battery as an example and with reference to the specific embodiments for preparing a cathode material of the present application and test manners for the electrochemical device. Those skilled in the art will understand that the preparation method described in the present application is merely an example, and any other suitable preparation methods are within the scope of the present application.

V. EMBODIMENTS

Preparation of Lithium Ion Battery

The cathode active material was adopted to prepare a lithium ion battery by the following preparation method. Specifically, the cathode active material, a conductive agent and a binder were sufficiently stirred and uniformly mixed at a certain weight ratio in N-methylpyrrolidone to form a cathode slurry. Then the front and back surfaces of a cathode current collector aluminum foil were uniformly coated with the obtained cathode slurry, drying was carried out at 85° C. to obtain a cathode active material layer. Afterward, the cathode active material layer was subjected to cold pressing, slitting, slice cutting and welding of the cathode tab to obtain a cathode.

The anode active material, a binder and a dispersant were sufficiently stirred and uniformly mixed at a certain weight ratio in deionized water to form an anode slurry. Then the front and back surfaces of an anode current collector copper foil were uniformly coated with the obtained anode slurry, drying was carried out at 85° C. to obtain an anode active material layer, and the anode active material layer was subjected to cold pressing, slitting, slice cutting and welding of the anode tab to obtain an anode.

The lithium salt $LiPF_6$ and the non-aqueous organic solvent (ethylene carbonate (EC):diethyl carbonate (DEC): propylene carbonate (PC):propyl propionate (PP):vinylene carbonate (VC)=20:30:20:28:2, mass ratio) were prepared to a solution according to the mass ratio of 8:92, as an electrolyte of the lithium ion battery.

The separator was made of a ceramic-coated polyethylene (PE) material separator.

The cathode, the separator, and the anode were stacked in order, so that the separator is between the cathode and the anode for the function of isolation. The electrode assembly was placed in a package, the electrolyte was injected, packaging was performed, and then formation was performed to obtain the final lithium-ion battery.

Electrode Thickness Test

Electrode thickness measurement was performed using a 0.1 μm high precision digital micrometer (Mitutoyo brand). The assembled battery cell was disassembled, the electrode was taken out, and the surface residue was washed away with a DEC solvent; the micrometer test head was wiped with dust-free paper to remove foreign matter to ensure the test accuracy; and the electrode was put onto the micrometer test head, the micrometer handle was rotated to closely contact the electrode, and the thickness value was read. Ten different points on the electrode were selected and ten pieces of thickness data were obtained and averaged.

Specific embodiments of the electrodes provided by the present application will be described in detail below.

(I) Embodiments 1 to 4 and Comparative Examples 1 to 4

Embodiments 1 to 4 relate to partitioned coating on the cathode and no partitioned coating on the anode. The preparation methods of the cathodes in Embodiments 1 to 4 and Comparative Examples 1 to 4 will be specifically described below:

Preparation Method of Electrode of Embodiment 1:

(1) Preparation of Slurry

Cathode NCM811/NCM523 slurry: A cathode active component NCM811 (220 mAh/g)/NCM523 (180 mAh/g), a conductive agent Super-P and a binder polyvinylidene fluoride (PVDF) were mixed at a weight ratio of 97%:1.5%:1.5%, diluted with an appropriate amount of N-methylpyrrolidone, and then stirred in a vacuum mixer to form a uniform cathode slurry.

Anode graphite slurry: Anode active component graphite, binder styrene-butadiene rubber (SBR) and dispersant carboxymethyl cellulose (CMC) were mixed at a weight ratio of 97%:1%:2%, diluted with an appropriate amount of distilled water, and then stirred in a vacuum mixer to form a uniform anode slurry.

(2) Cathode Partitioned Coating

Cathode partitioned coating: Partitioned coating was performed as follows:

A. The NCM811 slurry prepared in step (1) was applied to one side of the body region (hereinafter referred to as the first cathode region) of the aluminum foil by a body coating head, and the NCM523 slurry prepared in step (1) was applied to the side of a region 10 mm from the edge of the body region (hereinafter referred to as the second cathode region) by an edge coating head. The coated single-sided electrode was dried in a high-temperature oven at 85° C.

B. The above single-sided coated electrode was subjected to the second side coating, and the coating method, regions and materials were the same as described in step A. The coated double-sided electrode was dried in a high-temperature oven at 85° C. to obtain the cathode of Embodiment 1.

(3) Anode Coating

C. The anode slurry prepared in step (1) was applied to one side of the copper foil substrate, and the coated single-sided electrode was dried in a high-temperature oven at 85° C.

D. The above single-sided coated electrode was subjected to the second side coating, and the coating method, regions and materials were the same as described in step C. The coated double-sided electrode was dried in a high-temperature oven at 85° C. to obtain the anode of Embodiment 1.

Preparation Method of Electrode of Embodiment 2:

Embodiment 2 differs from Embodiment 1 only in that the active material of the second cathode region was replaced with LCO-180 (180 mAh/g).

Preparation Method of Electrode of Embodiment 3:

Embodiment 3 differs from Embodiment 1 only in that the active material of the first cathode region was replaced with LCO-180 (180 mAh/g), and the active material of the second cathode region was replaced with LFP (160 mAh/g).

Preparation Method of Electrode of Embodiment 4:

Embodiment 4 differs from Embodiment 1 only in that the active material of the second cathode region was replaced with a mixture of 50 wt % of NCM811 and 50 wt % of NCM523.

Preparation Methods of Electrodes of Comparative Examples 1 to 4:

Comparative Examples 1 to 4 respectively correspond to Embodiments 1 to 4. Comparative Example 1 differs from Embodiment 1 only in that the cathode was not subjected to partitioned coating, and the slurry of the first cathode region in the corresponding embodiment was applied to the body region of the aluminum foil according to a conventional process.

The data of the active materials on the cathodes and the thicknesses of the anodes before and after cycling in Embodiments 1 to 4 and Comparative Examples 1 to 4 are shown in Table 3 below.

material having a smaller specific capacity, the degree of lithium deposition of the anode can be effectively reduced, thereby enhancing the safety of the lithium ion battery.

(II) Embodiments 5 to 7 and Comparative Examples 5 to 6

Embodiments 5 to 7 and Comparative Examples 5 to 6 relate only to partitioned coating on the anode and no partitioned coating on the cathode. The preparation methods of the anodes in Embodiments 5 to 7 and Comparative Examples 5 to 6 will be specifically described below:

Preparation Method of Electrode of Embodiment 5:

(1) Preparation of Slurry

Anode graphite/GNS slurry: Anode active component graphite (370 mAh/g)/GNS (740 mAh/g), binder styrene-butadiene rubber (SBR) and dispersant carboxymethyl cellulose (CMC) were mixed at a weight ratio of 97%:1%:2%, diluted with an appropriate amount of distilled water, and then stirred in a vacuum mixer to form a uniform anode slurry.

Cathode NCM811 slurry: A cathode active component NCM811 (220 mAh/g), a conductive agent Super-P and a binder polyvinylidene fluoride (PVDF) were mixed at a weight ratio of 97%:1.5%:1.5%, diluted with an appropriate amount of N-methylpyrrolidone, and then stirred in a vacuum mixer to form a uniform cathode slurry.

(2) Anode Partitioned Coating

Anode partitioned coating: Partitioned coating was performed as follows:

A. The graphite (370 mAh/g) slurry prepared in step (1) was applied to one side of the body region (hereinafter referred to as the first anode region) of the copper foil by a body coating head, and the GNS (740 mAh/g) slurry prepared in step (1) was applied to the side of a region 10 mm from the edge of the body region (hereinafter referred to as

TABLE 3

| | The first cathode region | The second cathode region | Thickness of the first anode region before cycle (μm) | Thickness of the second anode region before cycle (μm) | Thickness of the first anode region after 500 cycles (μm) | Thickness of the second anode region after 500 cycles (μm) |
|---|---|---|---|---|---|---|
| Embodiment 1 | NCM811 (220 mAh/g) | NCM523 (180 mAh/g) | 105.3 | 98.2 | 127.3 | 118.3 |
| Comparative Example 1 | NCM811 (220 mAh/g) | NCM811 (220 mAh/g) | 105.9 | 98.7 | 128.1 | 145.0 |
| Embodiment 2 | NCM811 (220 mAh/g) | LCO (180 mAh/g) | 93.5 | 83.9 | 116.8 | 106.8 |
| Comparative Example 2 | NCM811 (220 mAh/g) | NCM811 (220 mAh/g) | 93.1 | 85.1 | 119.8 | 137.8 |
| Embodiment 3 | LCO-180 (180 mAh/g) | LFP (160 mAh/g) | 98.6 | 88.3 | 122.3 | 121.2 |
| Comparative Example 3 | LCO-180 (180 mAh/g) | LCO-180 (180 mAh/g) | 97.6 | 87.3 | 121.0 | 142.3 |
| Embodiment 4 | NCM811 (220 mAh/g) | 50% of NCM811 and 50% of NCM523 (200 mAh/g) | 102.3 | 92.5 | 126.0 | 126.9 |
| Comparative Example 4 | NCM811 (220 mAh/g) | NCM811 (220 mAh/g) | 102.9 | 93.5 | 125.6 | 148.9 |

*In the lithium ion battery, the lithium deposition phenomenon of the anode is more serious than that of the cathode. Therefore, the thickness parameter of the anode is used to measure the degree of lithium deposition in the lithium ion battery, thereby reflecting the safety performance of the lithium ion battery.

Referring to the data of Embodiments 1 to 4 and Comparative Examples 1 to 4 shown in Table 3, it is known that by coating the cathode thin region with a cathode active the second anode region) by an edge coating head. The coated single-sided electrode was dried in a high-temperature oven at 85° C.

B. The above single-sided coated electrode was subjected to the second side coating, and the coating method, regions and materials were the same as described in step A. The coated double-sided electrode was dried in a high-temperature oven at 85° C. to obtain the anode of Embodiment 2.

(3) Cathode Coating

C. The cathode slurry prepared in step (1) was applied to one side of the aluminum foil substrate, and the coated single-sided electrode was dried in a high-temperature oven at 85° C.

D. The above single-sided coated electrode was subjected to the second side coating, and the coating method, regions and materials were the same as described in step C. The coated double-sided electrode was dried in a high-temperature oven at 85° C. to obtain the cathode of Embodiment 5.

Preparation Methods of Electrodes of Embodiments 6 to 7:

Embodiment 6 differs from Embodiment 5 only in that the active material of the second anode region was replaced with a mixture of 95 wt % of graphite and 5 wt % of SiC-2000.

Embodiment 7 differs from Embodiment 5 only in that the active material of the first anode region was replaced with a mixture of 90 wt % of graphite and 10 wt % of HC, and the active material of the second anode region was replaced with a mixture of 90 wt % of graphite and 10 wt % of SiOx-1000.

Preparation Methods of Electrodes of Comparative Examples 5 to 6:

Comparative Example 5 corresponds to Embodiments 5 and 6. Comparative Example 5 differs from Embodiments 5 and 6 only in that the anode was not subjected to partitioned coating, and the graphite (370 mAh/g) slurry was applied to the body region of the copper foil according to a conventional process.

Comparative Example 6 corresponds to Embodiment 7. Comparative Example 6 differs from Embodiment 7 only in that the anode was not subjected to partitioned coating, and the mixture slurry of 90 wt % of graphite and 10 wt % of HC was applied to the body region of the copper foil according to a conventional process.

The data of the active materials on the anodes and the thicknesses of the anodes before and after cycling in Embodiments 5 to 7 and Comparative Examples 5 to 6 are shown in Table 4 below.

TABLE 4

| | The first anode region | The second anode region | Thickness of the first anode region before cycle (μm) | Thickness of the second anode region before cycle (μm) | Thickness of the first anode region after 500 cycles (μm) | Thickness of the second anode region after 500 cycles (μm) |
|---|---|---|---|---|---|---|
| Embodiment 5 | Gr (370 mAh/g) | GNS (740 mAh/g) | 119.1 | 112.9 | 132.2 | 135.1 |
| Embodiment 6 | Gr (370 mAh/g) | 95 wt % of Gr and 5 wt % of SiC-2000 (452 mAh/g) | 76.2 | 72.4 | 93.5 | 91.6 |
| Comparative Example 5 | Gr (370 mAh/g) | Gr (370 mAh/g) | 118.5 | 112.5 | 131.9 | 150.8 |
| Embodiment 7 | 90 wt % of Gr and 10 wt % of HC (378 mAh/g) | 90 wt % of Gr and 10% of SiOx-1000 (433 mAh/g) | 79.9 | 75.9 | 98.5 | 95.9 |
| Comparative Example 6 | 90 wt % of Gr and 10 wt % of HC (378 mAh/g) | 90 wt % of Gr and 10 wt % of HC (378 mAh/g) | 76.9 | 71.9 | 93.6 | 116.9 |

Referring to the data of Embodiments 5 to 7 and Comparative Examples 5 to 6 shown in Table 4, it is known that by coating the anode thin region with an anode active material having a larger specific capacity, the degree of lithium deposition of the anode can be effectively reduced, thereby enhancing the safety of the lithium ion battery.

(III) Embodiments 8 to 10 and Comparative Examples 7 to 8

Embodiments 8 to 10 and Comparative Examples 7 to 8 relate to partitioned coating respectively on the anode and the cathode. The data of the active materials and the thicknesses of the electrodes of Embodiments 8 to 10 and Comparative Examples 7 to 8 are shown in Table 5.

TABLE 5

| | The first cathode/ anode region | The second cathode/ anode region | Thickness of the first anode region before cycle (μm) | Thickness of the second anode region before cycle (μm) | Thickness of the first anode region after 500 cycles (μm) | Thickness of the second anode region after 500 cycles (μm) |
|---|---|---|---|---|---|---|
| Embodiment 8 | NCM811/Gr | NCM523/Si-C-450 | 82.1 | 75.9 | 98.7 | 92.2 |
| Embodiment 9 | NCM811/Gr | LMO/HC | 91.5 | 82.7 | 101.3 | 99.4 |
| Comparative Example 7 | NCM811/Gr | NCM811/Gr | 91.9 | 83.1 | 100.7 | 119.4 |
| Embodiment 10 | LCO-180/Gr | LFP/80 wt % of Gr and 20 wt % of HC | 93.1 | 84.0 | 105.3 | 103.8 |
| Comparative Example 8 | LCO-180/Gr | LCO-180/Gr | 93.3 | 83.7 | 103.6 | 122.1 |

Referring to the data of Embodiments 8 to 10 and Comparative Examples 7 to 8 shown in Table 5, it is known that by coating the cathode thin region with a cathode active material having a smaller specific capacity and by coating the anode thin region with an anode active material having a larger specific capacity, the degree of lithium deposition of the anode can be effectively reduced, thereby enhancing the safety of the lithium ion battery.

(IV) EMBODIMENTS 11 TO 14

As compared with Embodiments 1 to 10 above, a third region was further added in the electrodes of Embodiments 11 to 14. The third region was adjacent to the second region but away from the first region. The third region was a region 10 mm from the edge of the second region.

Preparation Methods of Electrodes of Embodiments 11 to 14:

Embodiment 11 differs from Embodiment 1 only in that the NCM333 (160 mAh/g) slurry was further applied to the third region of the cathode. The preparation process of the NCM333 slurry was the same as the preparation process of the NCM811 slurry.

Embodiment 12 differs from Embodiment 2 only in that the LCO-140 (140 mAh/g) slurry was further applied to the third region of the cathode. The preparation process of the LCO-140 slurry was the same as the preparation process of the NCM811 slurry.

Embodiment 13 differs from Embodiment 5 only in that the SiOx-1000 (1000 mAh/g) slurry was further applied to the third region of the anode. The preparation process of the SiOx-1000 slurry was the same as the preparation process of the graphite slurry.

Embodiment 14 differs from Embodiment 8 only in that the LMO (130 mAh/g) slurry was further applied to the third region of the cathode and the Si-C-2000 (2000 mAh/g) slurry was further applied to the third region of the anode. The preparation process of the LMO slurry was the same as the preparation process of the NCM811 slurry and the preparation process of the Si-C-2000 slurry was the same as the preparation process of the graphite slurry.

The data of thicknesses of the anodes of the lithium ion batteries of Embodiments 11 to 14 before and after cycling are shown in Table 6.

TABLE 6

| | Thickness of the first anode region before cycle (μm) | Thickness of the second anode region before cycle (μm) | Thickness of the third anode region before cycle (μm) | Thickness of the first anode region after 500 cycles (μm) | Thickness of the second anode region after 500 cycles (μm) | Thickness of the third anode region after 500 cycles (μm) |
|---|---|---|---|---|---|---|
| Embodiment 11 | 105.5 | 98.5 | 97.6 | 126.2 | 117.5 | 115.9 |
| Embodiment 12 | 94.3 | 83.4 | 81.5 | 116.2 | 107.1 | 102.9 |
| Embodiment 13 | 120.5 | 112.4 | 110.8 | 133.3 | 135.6 | 136.9 |
| Embodiment 14 | 83.2 | 75.6 | 73.5 | 98.3 | 93.5 | 94.3 |

Referring to the data in Table 6, it is known that after 500 charge and discharge cycles, the thickness variations of the thin regions of the anodes in Embodiments 11 to 14 are not large. This shows that by coating the cathode thin region with a cathode active material having a smaller specific capacity and/or by coating the anode thin region with an anode active material having a larger specific capacity, the degree of lithium deposition of the anode can be effectively reduced, thereby enhancing the safety of the lithium ion battery.

References to "some embodiments", "part of embodiments", "one embodiment", "another example", "example", "specific example" or "part of examples" in the whole specification mean that at least one embodiment or example in the application includes specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. A battery cell, comprising:
a cathode, the cathode comprising a cathode substrate having a surface coated with a first cathode active material in a first cathode region and a second cathode active material in a second cathode region to form a cathode coating; and
an anode, the anode comprising an anode substrate having a surface coated with a first anode active material in a first anode region and a second anode active material in a second anode region to form an anode coating, wherein
a value $CB_1$ is a ratio of a unit area capacity $Cs_{A1}$ of the first anode region to a unit area capacity $Csc_1$ of the first cathode region;
a value $CB_2$ is a ratio of a unit area capacity $Cs_{A2}$ of the second anode region to a unit area capacity $Csc_2$ of the second cathode region;
wherein at least one of the cathode coating and the anode coating is a partitioned coating having different unit area capacities, the partitioned coating formed by differential coating of active materials having different chemical compositions directly coated on the surface of the cathode substrate or the surface of the anode substrate, respectively; and
wherein $CB_2 \geq CB_1$.

2. The battery cell according to claim 1, wherein the unit area capacity $Cs_{A2}$ of the second anode region is greater than or equal to the unit area capacity $Cs_{A1}$ of the first anode region; and
wherein the unit area capacity $Csc_2$ of the second cathode region is less than or equal to 98% of the unit area capacity $Csc_1$ of the first cathode region.

3. The battery cell according to claim 2, wherein a thickness of the second anode region is less than a thickness of the first anode region, and
a thickness of the second cathode region is less than a thickness of the cathode in the first cathode region.

4. The battery cell according to claim 1, wherein the anode further comprises a third anode region, wherein
the third anode region comprises ceramic.

5. The battery cell according to claim 1, wherein the cathode further comprises a third cathode region, wherein
the third cathode region comprises ceramic.

6. The battery cell according to claim 4, wherein the anode further comprises a fourth anode region, wherein a unit area capacity $C_{SA4}$ of the fourth anode region is greater than or equal to the unit area capacity $C_{SA2}$ of the second anode region.

7. The battery cell according to claim 5, wherein the cathode further comprises a fourth cathode region, wherein a unit area capacity $C_{SC4}$ of the fourth cathode region is less than or equal to the unit area capacity $C_{SC2}$ of the second cathode region.

* * * * *